(12) United States Patent
Huang et al.

(10) Patent No.: US 12,546,588 B2
(45) Date of Patent: Feb. 10, 2026

(54) COLLIMATED PHASE MEASURING DEFLECTOMETRY

(71) Applicant: Brookhaven Science Associates, LLC, Upton, NY (US)

(72) Inventors: Lei Huang, Stony Brook, NY (US); Mourad Idir, South Setauket, NY (US); Tianyi Wang, Ridge, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 54 days.

(21) Appl. No.: 18/752,616

(22) Filed: Jun. 24, 2024

(65) Prior Publication Data

US 2024/0426701 A1 Dec. 26, 2024

Related U.S. Application Data

(60) Provisional application No. 63/510,184, filed on Jun. 26, 2023.

(51) Int. Cl.
*G01B 11/25* (2006.01)
*G01M 11/02* (2006.01)

(52) U.S. Cl.
CPC .......... *G01B 11/2527* (2013.01); *G01B 11/25* (2013.01); *G01M 11/0264* (2013.01)

(58) Field of Classification Search
CPC .......... G01M 11/0242; G01M 11/025; G01M 11/0257; G01M 11/0264; G01M 11/0005;
(Continued)

(56) References Cited

U.S. PATENT DOCUMENTS 4,294,544 A * 10/1981 Altschuler ......... G01B 11/2513
356/520
4,794,550 A * 12/1988 Greivenkamp, Jr. ......................
G01B 11/254
702/167

(Continued)

FOREIGN PATENT DOCUMENTS

CN  109341574 B  * 10/2020 ............. G01B 11/24
CN  111780688 A  * 10/2020 ......... G03B 21/2033

OTHER PUBLICATIONS

Knauer, M. C., et al., "Phase Measuring Deflectometry: a new approach to measure specular free-form surfaces," Institute of Optics, Information and Photonics, University of Erlangen-Nuremberg, Staudtstr. 7/B2, 91058 Erlangen, Germany Opt Metrol Prod Eng, Proc SPI, vol. 5457, pp. 366-376 (2004).

(Continued)

*Primary Examiner* — Gordon J Stock, Jr.
(74) *Attorney, Agent, or Firm* — Dorene Price

(57) ABSTRACT

Various examples relate to collimated phase measuring deflectometry. In one example, is a collimated phase measuring deflectometer system with a screen that emits a structured light pattern; a collimation optical system comprising a Fourier lens positioned such that the structured light pattern passes through the collimation optical system; a beam splitter positioned such that the structured light pattern is redirected to illuminate a surface of a specimen under test (SUT); and a camera having a telecentric lens positioned such that a deflected pattern produced by illuminating the surface of the SUT is captured by the camera. The deflection pattern is insensitive to the distance from the collimated phase measuring deflectometer to the SUT surface. In another example, a method includes emitting a structured light pattern; collimating the emitted light pattern;
(Continued)

reflecting collimated light to illuminate a SUT surface; and acquiring an image of a deflected pattern produced by the illumination.

20 Claims, 11 Drawing Sheets

(58) Field of Classification Search
CPC . G01B 11/25; G01B 11/2504; G01B 11/2509; G01B 11/2513; G01B 11/2518; G01B 11/2522; G01B 11/2527; G01B 11/2531; G01B 11/2536; G01B 11/254; G01B 11/2545; G01B 11/2441; G01B 11/24; G01J 9/00; G01J 9/02; G01J 2009/002; G01J 2009/004; G01J 2009/006; G01J 2009/0234; G01J 2009/0238
See application file for complete search history.

(56) References Cited

U.S. PATENT DOCUMENTS

| | | | | |
|---|---|---|---|---|
| 4,984,883 A | * | 1/1991 | Winocur | A61B 3/107 351/212 |
| 5,561,525 A | * | 10/1996 | Toyonaga | G01B 11/2441 356/512 |
| 6,717,661 B1 | * | 4/2004 | Bernstein | G01J 9/02 356/121 |
| 7,609,388 B2 | * | 10/2009 | Arieli | G11B 7/005 356/512 |
| 8,422,822 B2 | * | 4/2013 | Beghuin | G01B 11/25 382/280 |
| 10,527,403 B2 | * | 1/2020 | Hetzler | G01B 9/02057 |

OTHER PUBLICATIONS

Bothe, T., et al., "High-resolution 3D shape measurement on specular surfaces by fringe reflection," Opt Metrol Prod Eng, Bremer Institut für Angewandte Strahltechnik (BIAS), Proc. of SPIE, vol. 5457, pp. 411-422 (2004).

Häusler, G., et al., "Deflectometry vs. Interferometry," Institute of Optics, Information and Photonics, University Erlangen-Nuremberg, Staudtstr.7/B2, 91058 Erlangen, Germany, Optical Measurement Systems for Industrial Inspection VIII, Proc. of SPIE vol. 8788 (2013).

Huang, L., et al., "Review of phase measuring deflectometry," Opt Lasers Eng, vol. 107, pp. 247-257 (2018).

Huang, L., et al., "Comparison of two-dimensional integration methods for shape reconstruction from gradient data," Opt Lasers Eng, vol. 64, pp. 1-11 (2015).

* cited by examiner

COLLIMATED PHASE MEASURING DEFLECTOMETRY

CROSS-REFERENCE TO RELATED APPLICATION

This application claims the benefit of, and priority to, U.S. Provisional Application No. 63/510,184, filed Jun. 26, 2023, the disclosure of which is incorporated by reference herein in its entirety.

STATEMENT REGARDING FEDERALLY SPONSORED RESEARCH OR DEVELOPMENT

The present application was made with government support under Contract No. DE-SC0012704 awarded by the United States Department of Energy. The government has certain rights in the invention.

BACKGROUND

The need for better performance of optics in various applications such as telescopes, microscopes, illumination systems, virtual reality display devices, etc., directly results in a huge demand on aspherical and free-form optics. The fabrication of these optics requires the use of optical metrology to control production quality. The rigorous measurement requirements for high-grade optics poses various challenges to the current optical metrology techniques, for example, interferometry, triangulation, confocal, deflectometry, etc. These challenges come from different measurement-aspects, such as the measuring range, the precision and accuracy, and the measurement speed.

SUMMARY

The disclosed embodiments relate to an optical deflectometry setup. The present deflectometry measurement system is referred to as Collimated Phase Measuring Deflectometry (CPMD.) The CPMD system includes a collimated phase measuring deflectometer that comprises a screen which emits a structured light pattern from a first side of the screen and a collimation optical system comprising a Fourier lens, a first side and a second side. The collimation optical system may be disposed adjacent to the first side of the screen such that the structured light pattern emitted from the screen passes through the collimation optical system from its first side to its second side. The collimated phase measuring deflectometer also includes a beam splitter that is disposed adjacent to the second side of the collimation optical system opposite the screen such that the structured light pattern passing through the collimation optical system is redirected by the beam splitter to illuminate a surface of a specimen under test (SUT.) The SUT is located at a distance (d) from the beam splitter. Also included in the collimated phase measuring deflectometer is a camera that has a telecentric lens and is disposed beyond the beam splitter opposite the SUT such that a deflected pattern produced by illuminating the SUT surface is captured by the camera. The deflection pattern is insensitive to the distance from the collimated phase measuring deflectometer to the SUT surface.

The disclosed embodiments relate to a method of measuring deflectometry which includes emitting, by the use of for example, a screen, light in a structured light pattern to illuminate the SUT; collimating, by the collimation optical system comprising the Fourier lens, the light emitted by the screen; reflecting, by a beam splitter, at least a portion of the light collimated by the collimation optical system such that the surface of the SUT that is located a distance from the beam splitter is illuminated with the structured light pattern; and acquiring, by the camera, an image of a deflected pattern produced by illuminating the surface of the SUT with the structured light pattern, the deflection pattern insensitive to the distance from the collimated phase measuring deflectometer to the surface of the specimen under test.

The disclosed embodiments yet further relate to a collimated phase measuring deflectometer that includes the camera having a telecentric lens; a beam splitter disposed in a line of view of the camera and angled such that light transmitted through the beam splitter is directed toward the telecentric lens; the SUT disposed opposite the beam splitter from the camera and aligned with the beam splitter such that light reflected from the surface of the SUT is directed through the beam splitter toward the telecentric lens; the collimation optics system comprises the Fourier lens, the collimation optics system disposed adjacent to the beam splitter such that collimated light from the collimation optics system is reflected by the beam splitter to the surface of the specimen under test; and the screen disposed at a focal plane of the collimation optics system, the screen configured to emit a structured light pattern toward the collimation optics system thereby illuminating the surface of the SUT with the structured light pattern, the illumination producing a deflected pattern directed through the beam splitter toward the telecentric lens that is insensitive to a distance between the collimated phase measuring deflectometer and the surface of the specimen under test.

Other embodiments will become apparent from the following detailed description considered in conjunction with the accompanying drawings. It is to be understood, however, that the drawings are designed as an illustration only and not as a definition of the limits of any of the embodiments.

BRIEF DESCRIPTION OF DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
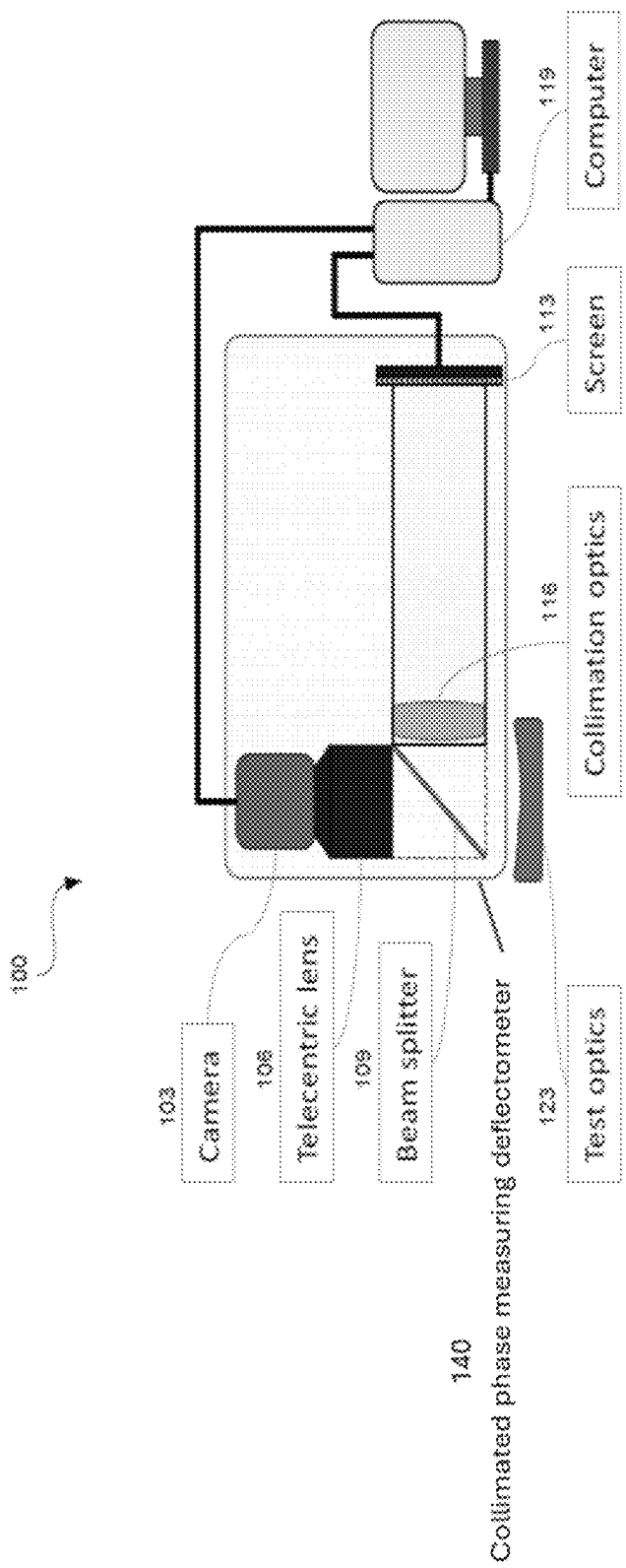
FIG. 1 is a diagram of an example Collimated Phase Measuring Deflectometry (CPMD) setup according to various embodiments of the present invention.

As a non-contact, full-field, slope-measurement-based optical measuring technique, Phase Measuring Deflectometry (PMD) offers a large slope measuring range (when compared to interferometry), relatively high speed (compared to pointwise profilers), and excellent configuration flexibility (compared to interferometry) necessary for many applications. For these reasons, the traditional PMD technique has received much attention from various research groups and optical metrology companies for specular optical surface characterization. However, there are several difficulties with the traditional PMD technique. These difficulties highly impede the use of the PMD in practical applications for shape measurement.

To begin, it is extremely difficult to accurately calibrate a traditional PMD system. A traditional PMD system consists of a camera, a reference mirror, and a screen to measure the shape of specular surfaces. The calibration of a traditional PMD system includes the camera calibration and the geometric calibration for the screen and the reference mirror. The calibration errors of the geometric positions of the screen, the reference mirror, and the auxiliary camera (if any) with respect to the primary camera will highly influence the slope measurement, especially in low frequency. This can easily lead to low-frequency errors in the final shape reconstruction of the surface under test.

In addition, the optical triangulation in the traditional PMD geometry will make the fringe phase not only sensitive to the surface slope, but also sensitive to the depth information of the test sample. For this reason, the test sample usually needs to be placed close to the position where the reference mirror was placed. This is difficult and inconvenient to achieve in practice and leads to many technical difficulties to fulfill this requirement. If the requirement is not met, considerable slope errors to the measurement result are introduced due to the height-slope ambiguity. To reduce this type of error, one can use an additional confocal sensor, or an intersection of two narrow laser beams, to guide and help position the sample. However, this solution cannot fully resolve this issue. The axial depth displacement between the reference mirror and the test sample will mainly introduce low-frequency reconstruction errors in a traditional PMD system.

Therefore, the traditional PMD technique is most useful for middle-frequency and high-frequency waviness and textures on a specular surface. Additionally, the traditional PMD is beneficial for measuring the relative out-of-plane deformation on the surface. However, the traditional PMD is not suitable for the low-frequency form measurement due to the geometric calibration error and the sample positioning error. This strongly limits the use of the traditional PMD technique in many application scenarios where an absolute surface shape is required.

Disclosed herein are various examples of a configuration of an optical deflectometry setup. This deflectometry system is referred to as Collimated Phase Measuring Deflectometry (CPMD). The CPMD technique has an on-axis optical geometry, a collimated beam, and an areal phase measurement capability. The use of CPMD expands the measurement capabilities of a traditional PMD system and has enhanced usefulness and versatility for optical metrology.

Unlike the traditional PMD system, which commonly uses diverging camera sight rays to look at the fringe patterns on screen reflections, the CPMD technique uses a telecentric camera lens in an on-axis optical geometry to restrict the camera rays parallel to each other, and a set of collimation optics to collimate the beam from each source pixel on the screen. The CPMD technique solves at least two challenging issues with respect to the traditional PMD technique.

Figures 2A, 2B:
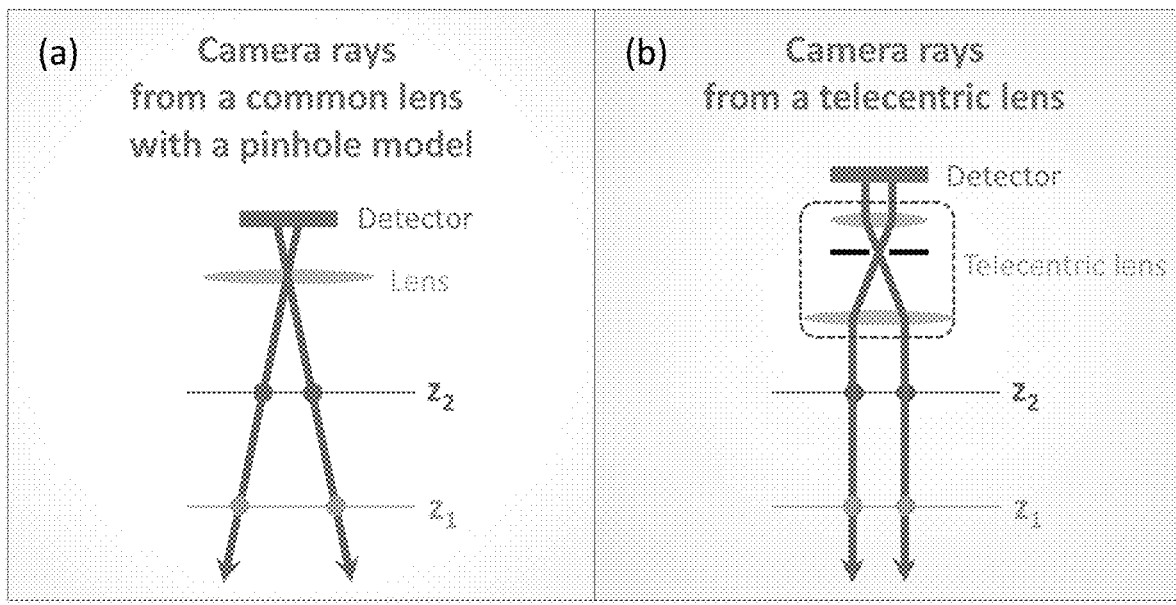
FIGS. 2(a) and 2(b) are a comparison of a lens used in a traditional Phase Measuring Deflectometry (PMD) setup (FIG. 2(a)) and a telecentric lens used in an example CPMD setup (FIG. 2(b)) according to various embodiments of the present invention.

First, the CPMD can determine the lateral coordinates independently of the depth information. In a traditional PMD technique, the lateral coordinates are linked to the depth position of the test surface (FIG. 2(*a*)). This makes it impossible to determine the lateral coordinates without knowing the depth position of a point on the test surface. In CPMD, however, the on-axis optical geometry with a telecentric lens makes the lateral coordinates insensitive to the depth position of the test surface. (FIG. 2(*b*)). Indeed, the use of the telecentric lens in the CPMD technique makes the lateral coordinates of one point on the test surface detected by a camera pixel independent from its depth location.

Figures 3A, 3B:
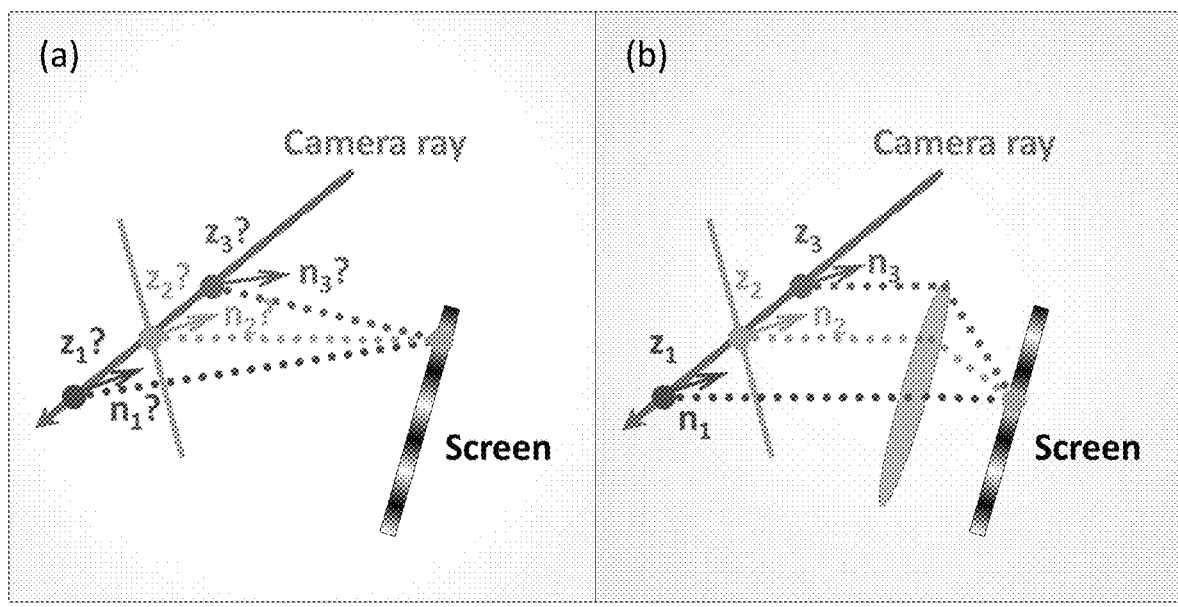
FIGS. 3(a) and 3(b) are a comparison of a traditional PMD setup (FIG. 3(a)) and an example CPMD setup (FIG. 3(b)) according to various embodiments of the present invention.
Figures 4A, 4B:
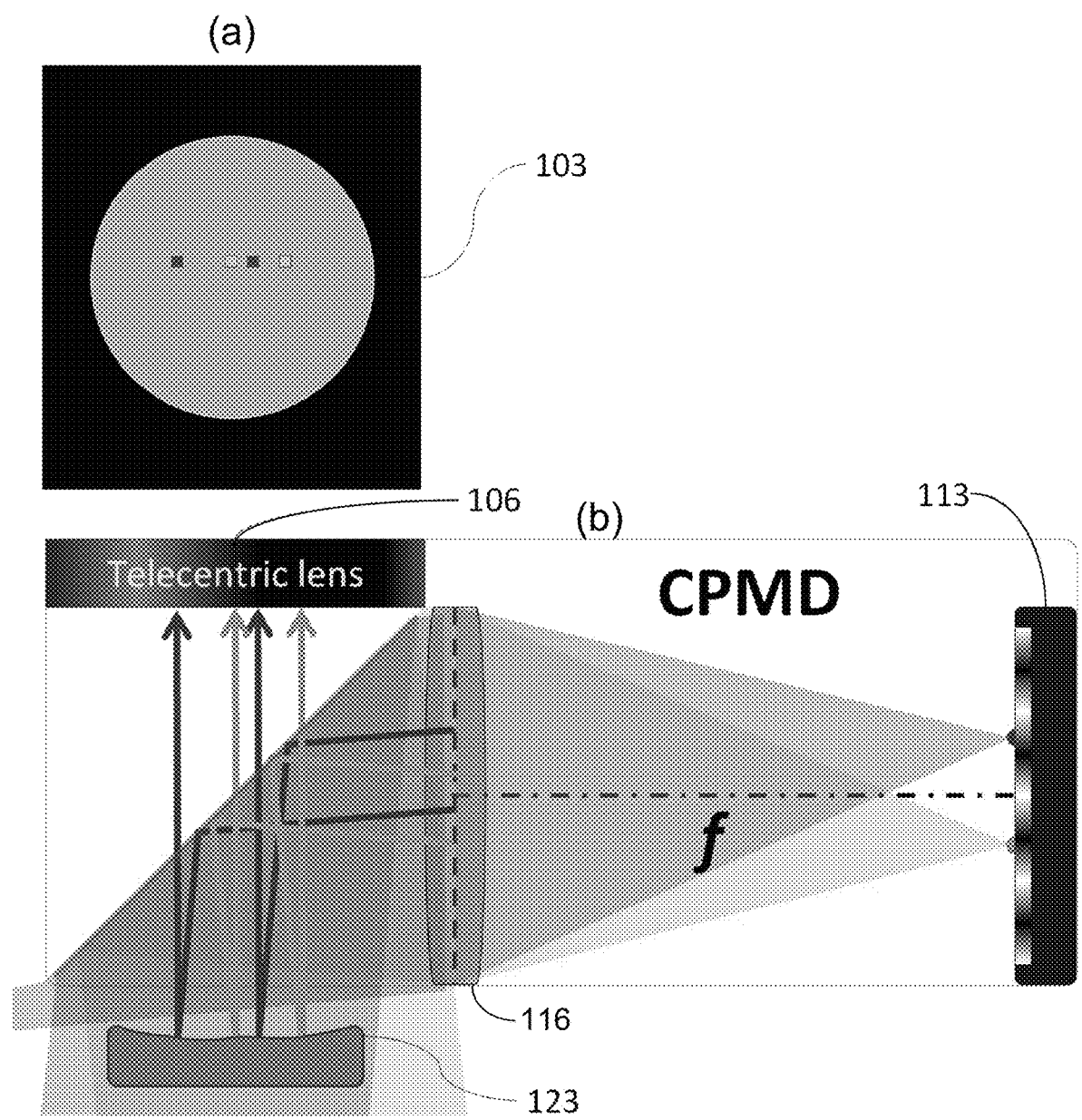
FIGS. 4(a) and 4(b) are an example of the relationship between a screen pixel (FIG. 4(a)) and a camera sight ray in an example CPMD setup (FIG. 4(b)) according to various embodiments of the present disclosure.
Figure 5A:
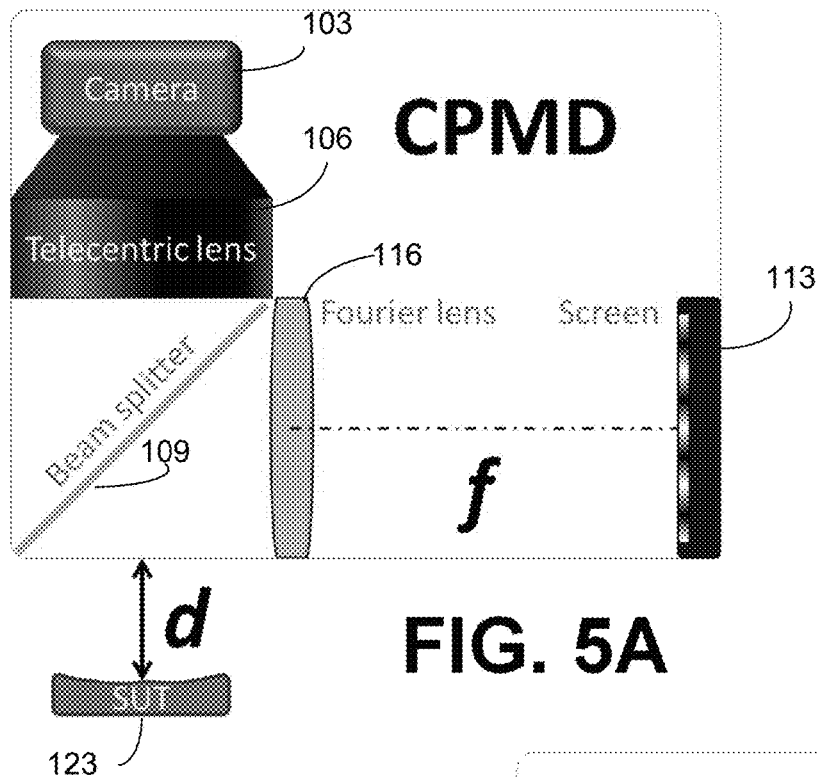
FIGS. 5A and 5B are example CPMD setups according to various embodiments of the present disclosure, where d, $d_1$, and $d_2$ are the working distance that is the distance between the front end of the collimated phase measuring deflectometer to the surface of the specimen under test.
Figure 5B:
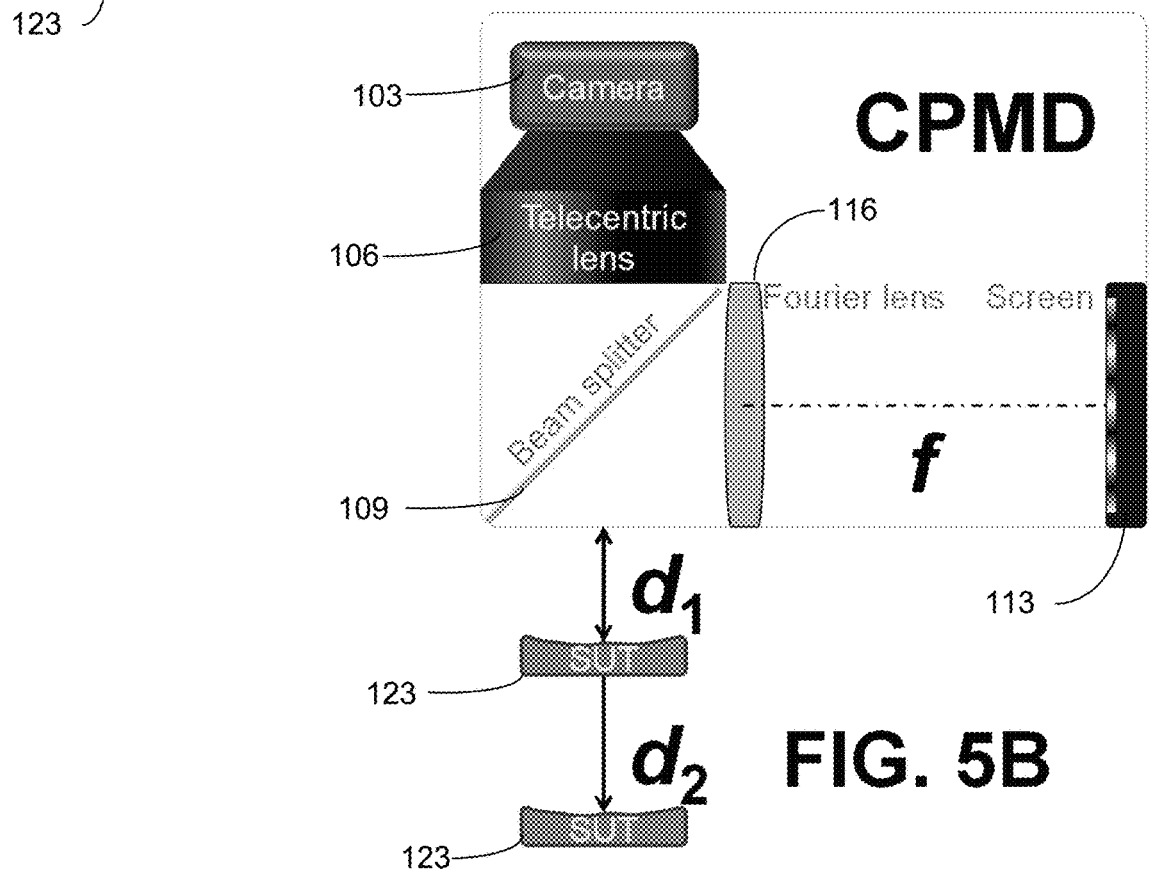

Second, the slope calculation in the traditional PMD is linked to the distance between the test surface and the screen and to the posture of the screen. This makes the slopes highly dependent on the depth position of the test sample as shown in FIG. 3(*a*). Thus, a small change on the depth of the test sample will lead to considerable slope errors. This phenomenon is also known as "the height-slope ambiguity." However, the collimation optics used in the proposed CPMD in FIG. 3(*b*) makes the fringe phase insensitive to the depth position of the test sample, and mainly sensitive to the surface slope of the test sample. This innovation can highly reduce the requirement of the sample placement in practice, and therefore reduce the low-frequency error in the reconstruction result. It brings significant convenience in a practical measurement setup. For instance, the proposed CPMD technique offers the possibility of automatic consequent metrology procedures, such as a sub-aperture stitching.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principles disclosed by the following illustrative examples.

With reference to FIG. 1, the depicted CPMD system 100 is composed of a camera 103 with a telecentric lens 106, a beam splitter 109, a screen 113 with a collimation optical system 116, and a computing device 119 for data acquisition and analysis. The CPMD system 100 can be used to measure the slope of various surfaces of a specimen under test, such as a test optic 123. The CPMD system 100 is composed of a collimated phase measuring deflectometer 140 having a front end and the collimated phase measuring deflectometer 140 may be connected to a computing device (computer) 119.

The camera 103 of the collimated phase measuring deflectometer 140 may by wire or wirelessly be connected to a computing device (computer) 119. The computing device 119 may be used to synchronize image acquisition of camera 103 and displays on screen 113. The camera 103 acts as a measuring sensor and is capable of capturing images of reflected light. The camera 103 can send these captured images to the computing device 119 over a wired or wireless connection. In some embodiments, the camera 103 has a telecentric lens 106.

The telecentric lens 106 is a lens having a pupil set at infinity. The telecentric lens 106 may comprise a series of lenses, or compound lenses, resulting in the chief rays, which pass through the aperture, being parallel to the optical axis of the lens.

The beam splitter 109 is a device which splits beams of light into transmitted and reflected light. The beam splitter 109 can be a cube composed of two prisms. In some embodiments, the beam splitter 109 is a one-way mirror.

The screen 113 (e.g., an LED or other appropriate display) is used to emit the light which will be used in the CPMD system 100 for measuring the surface slopes of the specimen under test, e.g., a test optic 123. The screen 113 of the collimated phase measuring deflectometer 140 may be connected by wire or wirelessly to a computing device (computer) 119. The computing device 119 may be used to synchronize displays on screen 113 and image acquisition of camera 103.

The collimation optical system (optics) 116 is a system of optical components designed to produce a collimated beam of light, or parallel rays of light. In some embodiments, the collimation optical system 116 is a Fourier lens. In some embodiments, the collimation optical system 116 is a series of lenses and/or mirrors which produce collimated beams.

The computing device 119 can include a processor, a memory, and/or a network interface. In some embodiments, the computing device 119 can be coupled to a network 126. The computing device 119 can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The computing device 119 can be representative of a plurality of computing devices. The computing device 119 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the computing device 119 or can be connected to the computing device 119 through a wired or wireless connection. In some embodiments, the display can include a user interface.

In many embodiments, the computing device 119 can have a data store. The data store can be representative of a plurality of data stores, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. Various data can be stored in the data store that is accessible to the computing device 119.

The specimen under test such as, e.g., a test optic 123 can comprise one or more surfaces of interest. The specimen under test or test optic 123 is the subject of CPMD, and can be placed below the beam splitter 109 and the camera 103 as shown in FIG. 1.

Next, a general description of the operation of the various components of the CPMD system 100 is provided. Although this general description illustrates the interactions between the components of the CPMD system 100, other interactions or sequences of interactions are possible in various embodiments of the present disclosure. To begin, the light is physically emitted from the screen 113, passing the collimation optical system 116, reflected from the beam splitter 109 onto the test optic 123 or other specimen under test, where it is reflected through the beam splitter 109 and telecentric lens 106, and is finally recorded on the pixels of the camera 103. From the data analysis point of view, the process can be treated in an inverse way starting with the sight rays of the camera 103 from each of the pixels of the camera 103. These camera sight rays go through the telecentric lens 106 and beam splitter 109, are reflected by the surface of the test optic 123 or specimen under test and the beam splitter 109, and then reach the screen 113 through the collimation optical system 116. The screen pixels can be encoded by certain coded patterns, usually fringe patterns.

Therefore, from the camera recorded pattern(s), one camera sight ray can be eventually traced to its corresponding screen pixel (at sub-pixel level). In other words, one can know the location of the light source on the screen 113 which (dominantly) illuminates that camera pixel. With this information, the local slope on the surface where the camera ray is incident on the surface of the test optic 123 or specimen under test can be calculated.

To measure the low-frequency surface shape components and to extremely relax the axial depth tolerance of the test sample positioning, there are 3 innovations in the proposed CPMD configuration.

The first is the on-axis optical geometry with a beam splitter 109. Compared with the traditional PMD off-axis geometry, this on-axis geometry can avoid the optical triangulation relationship between the axial depth and the camera pixel coordinates.

The second innovation is the use of a telecentric lens 106. Comparing to the common camera lens, it highly decouples the relation between the in-plane coordinates and the axial depth.

The third innovation is that a collimation optical system 116 is installed in front of the screen 113. The collimation optical system 116 can comprise a Fourier lens. The screen 113 is placed at the focal plane of the collimation optical system 116. This can make the screen pixel coordinates only sensitive to the surface slopes of the test optic 123 and become insensitive to the axial depth position of the specimen under test or test optic 123.

Overall, the capability of the CPMD technique to measure low-frequency surface shape components and relax the axial depth tolerance of the sample positioning makes it a valuable tool for optical metrology, particularly in applications where the focus is on the overall shape and slope of a surface.

After placing the test optic 123 or other specimen under test in the field of view of the camera 103, the screen 113 can flexibly display structured light patterns, such as fringe stripes, to illuminate the test optic 123. The computing device 119 is used to synchronize the pattern display on the screen 113 and the image acquisition with the camera 103.

Figures 7A, 7B:
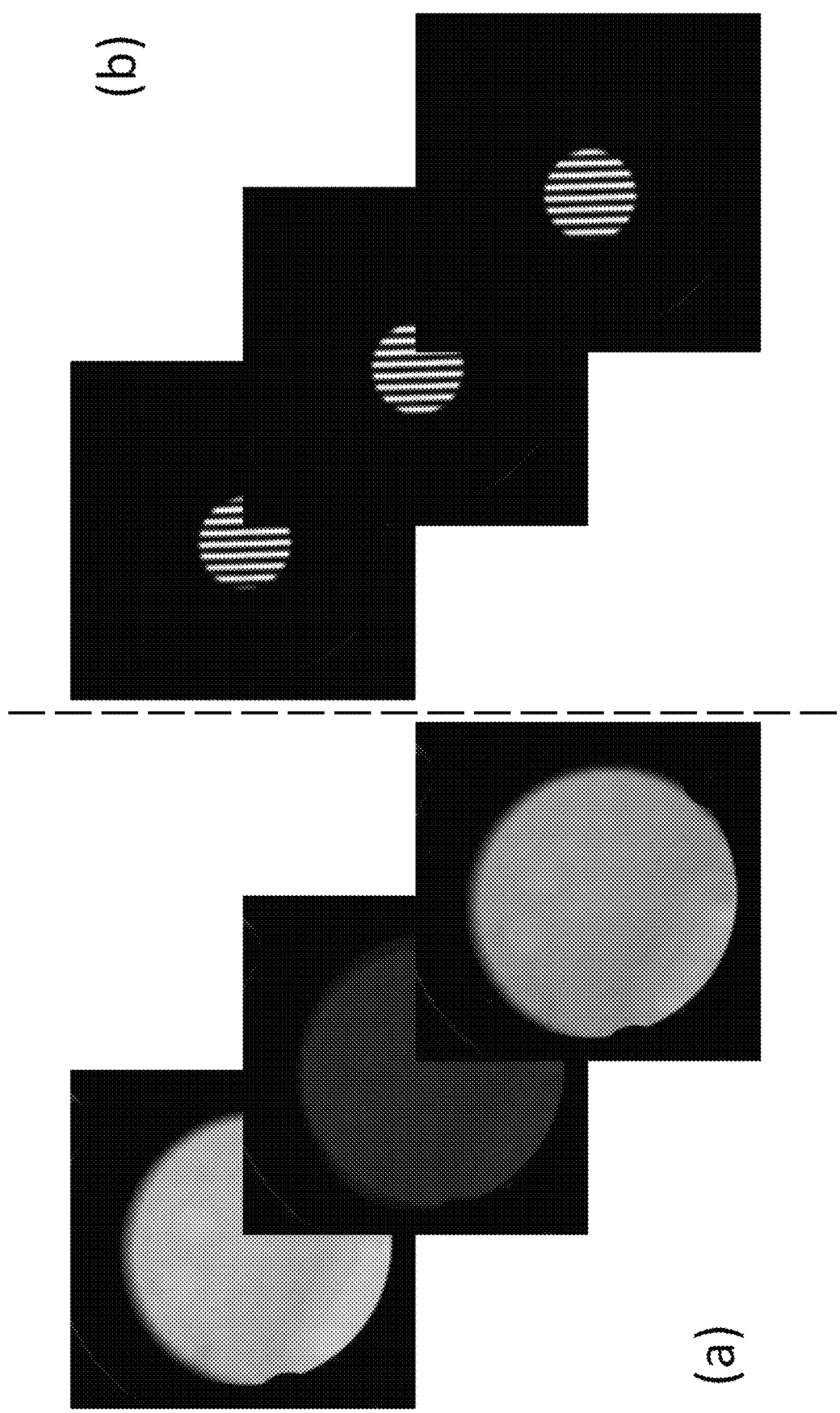
FIG. 7 depicts example images of a flat surface (FIG. 7(*a*)) and a curved surface (FIG. 7(*b*)) captured by a CPMD system according to various embodiments of the present disclosure.

If the surface of the test optic 123 is flat, all camera pixels will look at the same spot on the screen due to the telecentric lens 106 and the collimation optical system 116. The image can be in a homogeneous gray scale value as shown in FIG. 7(a). This is like the "null test" condition in the interferometry.

When measuring curved optical surfaces with a certain Radius of Curvature (RoC), the local slopes on the entire surface of the test optic 123 or specimen under test can vary in a large range, which reflect the camera sight rays into different angles. After the rays pass through the collimation optical system 116, the rays will shoot on the screen 113 at different locations depending on their angles. Typically, a carrier fringe pattern can therefore be observed in the camera 103 as shown in FIG. 7(b). The data processing is started from the captured fringe patterns reflected from the test optic 123 or specimen under test. These images contain the shape information of the surface of the specimen or test optic 123.

After the image acquisition, the slope information on the specimen or test optic 123 can be obtained from these images or called as "fringe patterns." The data processing includes the following steps.

Figure 6:
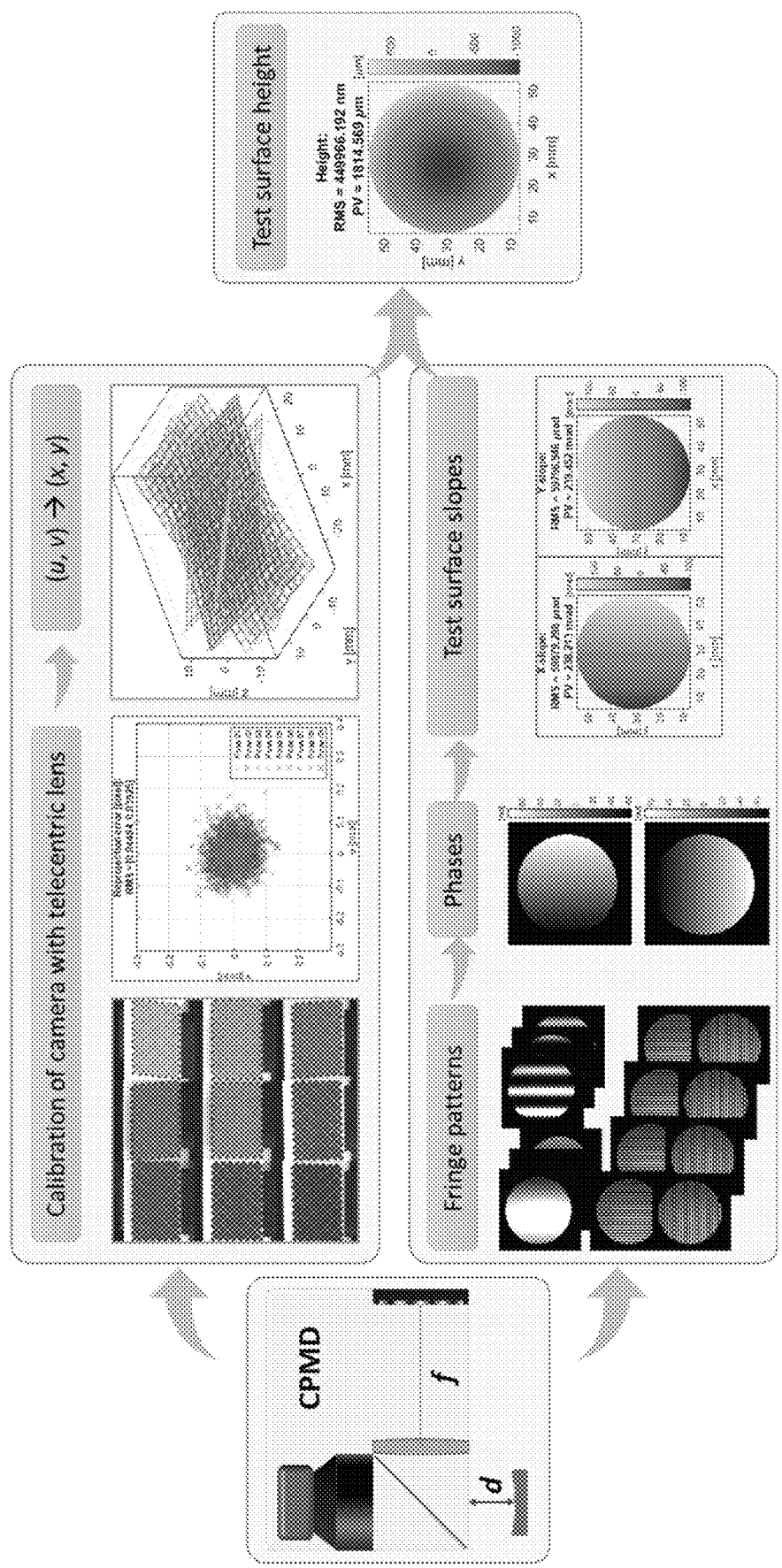
FIG. 6 is a process diagram depicting one example of functionality of CPMD according to various embodiments of the present disclosure.

An example of fringe analysis to retrieve the fringe phases is shown in FIG. 6. An N-step phase shifting algorithm can be used to obtain the pixel-independent wrapped phase value for each camera pixel, which has a relative phase value $\varphi$ limited within $[-\pi, \pi]$.

$$\varphi = -\arctan \frac{\sum_{n=0}^{N-1} I_n \sin \frac{2n\pi}{N}}{\sum_{n=0}^{N-1} I_n \cos \frac{2n\pi}{N}}$$

Figure 8:
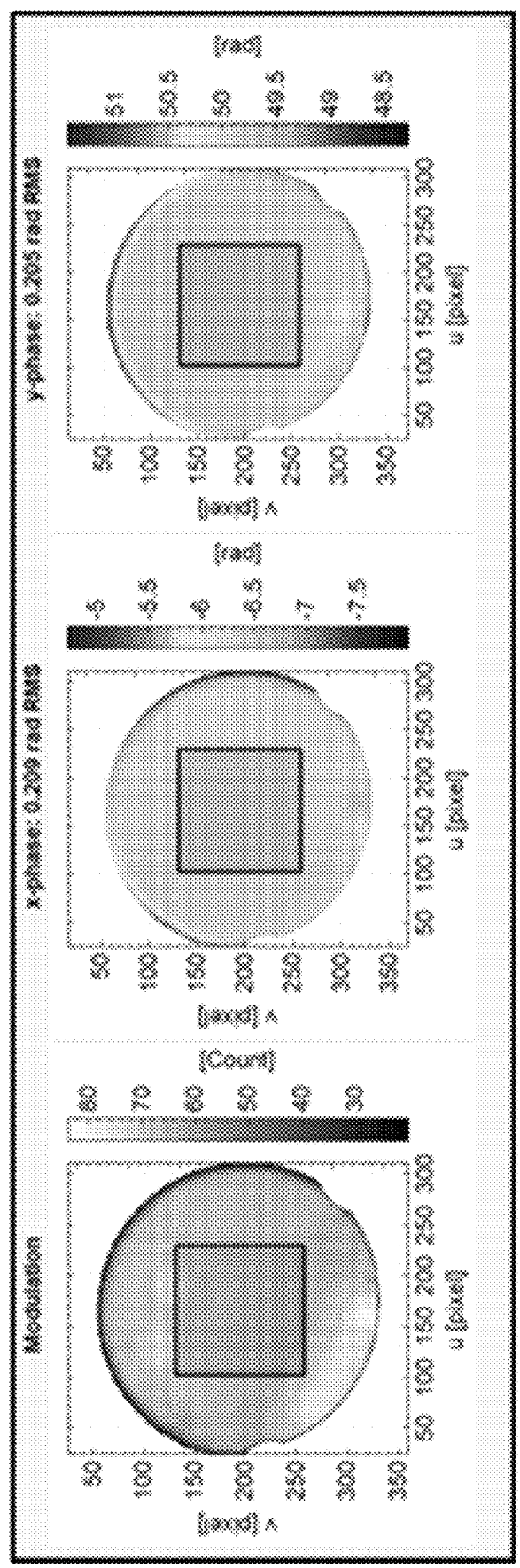
FIG. 8 depicts example phase maps resulting from modulation (left), unwrapped phases in the x-direction, x-phase (center), and unwrapped phases in the y-direction, y-phase (right), according to various embodiments of the present disclosure.

The modulation map M (as shown in FIG. 8 (left)) can be used to make judgement of the reliable data. The modulation map can be described by:

$$M = \frac{2}{N} \sqrt{\left(\sum_{n=0}^{N-1} I_n \sin \frac{2n\pi}{N}\right)^2 + \left(\sum_{n=0}^{N-1} I_n \cos \frac{2n\pi}{N}\right)^2}$$

To get the absolute fringe phase values $\phi$ which can link to the screen pixels, a temporal phase unwrapping method can be used starting from low-frequency to the high-frequency fringe patterns. The fringe phase values can be given by:

$$\phi_h = \varphi_h + 2\pi \cdot \left\lfloor \frac{\frac{\lambda_l}{\lambda_h}\phi_l - \varphi_h}{2\pi} + 0.5 \right\rfloor,$$

where the $\lambda_l$ and $\lambda_h$ are the fringe periods of the low-frequency and high-frequency fringes. From this equation, the absolute phase in a higher frequency $\phi_h$ can be determined from the wrapped phase $\varphi_h$ based on the absolute phase of a lower frequency $\phi_l$ in a recursive manner. The lowest frequency fringes do not have any phase wraps by the pattern design. While this example shows one method of temporal phase unwrapping, there are other groups of temporal phase unwrapping algorithms which may be utilized here, e.g., a multi-frequency (hierarchical) approach, a multi-wavelength (heterodyne) approach, and a number-theoretical approach.

Figure 9:
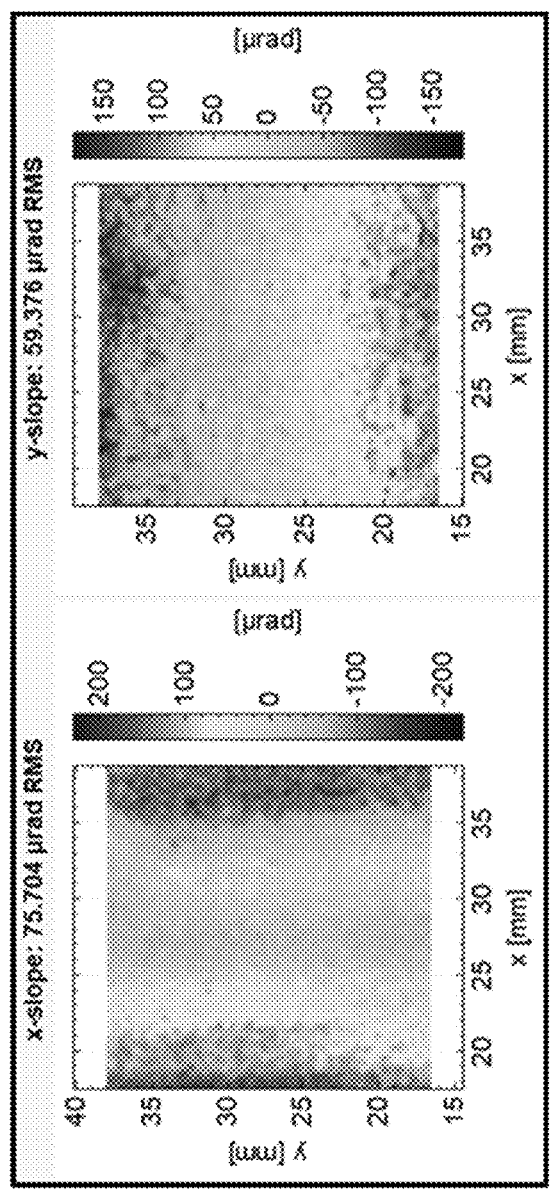
FIG. 9 depicts an example of typical results of surface slope calculations for the x slope (left) and y slope (right), according to various embodiments of the present disclosure.

Based on the geometry of the collimation optical system 116 as a Fourier lens, as shown in FIG. 9, the surface slopes $(s_x, s_y)$ of the test optic or specimen under test can be determined by:

$$s_x = \tan(\arctan(a_x)/2),$$

$$s_y = \tan(\arctan(a_y)/2),$$

where $a_x$ and $a_y$ are the wavefront slopes of the reflected rays determined by:

$$a_x = \frac{d_x}{f} = \frac{\frac{\phi_x - \phi_{x_0}}{2\pi} p_x \cdot \sigma}{f} = \frac{(\phi_x - \phi_{x_0}) p_x \cdot \sigma}{2\pi f},$$

$$a_y = \frac{d_y}{f} = \frac{\frac{\phi_y - \phi_{y_0}}{2\pi} p_y \cdot \sigma}{f} = \frac{(\phi_y - \phi_{y_0}) p_y \cdot \sigma}{2\pi f},$$

where $d_x$ and $d_y$ are the displacements of the "camera ray" on the screen 113 with respect to its nominal position when reflected by a reference flat mirror. The fringe period is $p_x$ and $p_y$ in pixel unit, and $\sigma$ is the screen pixel pitch. With a test optic 123, the fringe phases are $\phi_x$ and $\phi_y$, while with a reference flat mirror, the nominal fringe phases are $\phi_{x_0}$ and $\phi_{y_0}$, in x-fringe and y-fringe patterns, respectively. Here, f stands for the focal length of the collimation optical system 116.

It is notable that the slope values are only dependent on the fringe phases and the focal length. In theory, it is independent of the distances between the surface of the test optic 123 or specimen under test and collimated phase measuring deflectometer 140, the screen 113 or the collimation optical system 116.

Figure 10:
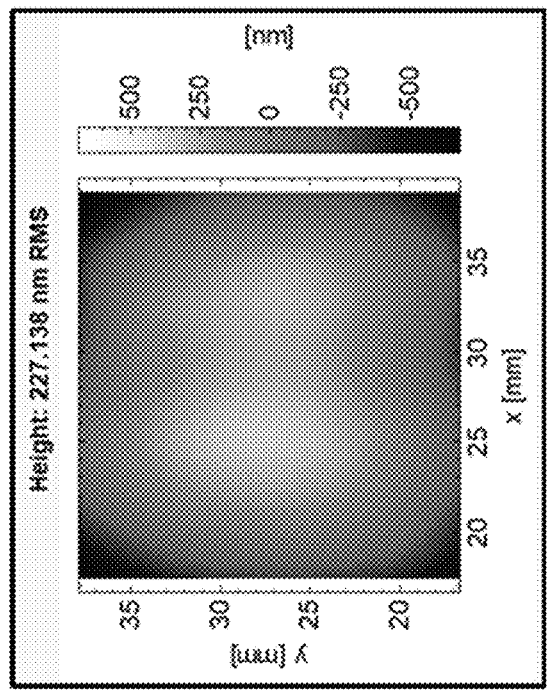
FIG. 10 depicts an example of a typical height map reconstruction according to various embodiments of the present disclosure.
Figures 11A, 11B, 11C:
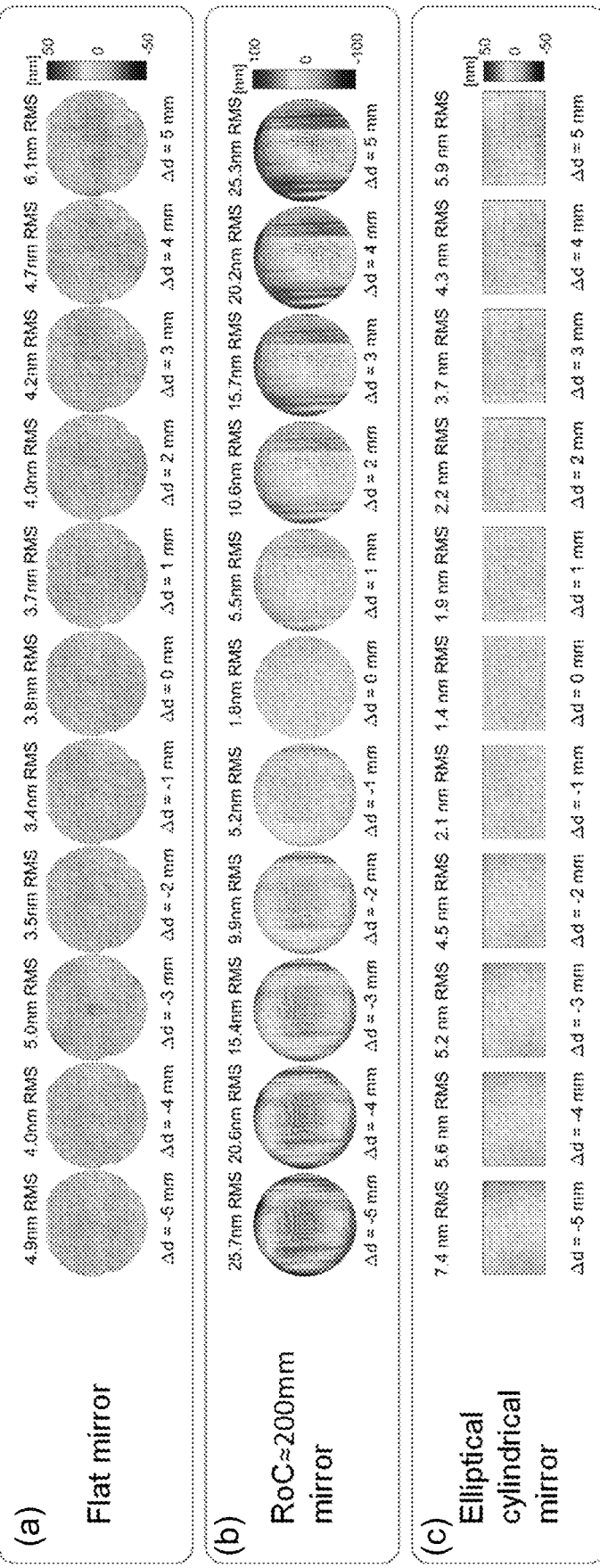
FIGS. 11(*a*) through 11(*c*) depict examples of typical results from CPMD analysis, demonstrating the independence of the CPMD measurement from the depth position of the sample using a flat mirror (FIG. 11(*a*)), a mirror having RoC=200 mm (FIG. 11(*b*)), and an elliptical cylindrical mirror (FIG. 11(*c*)), according to various embodiments of the present disclosure.
Figure 12:
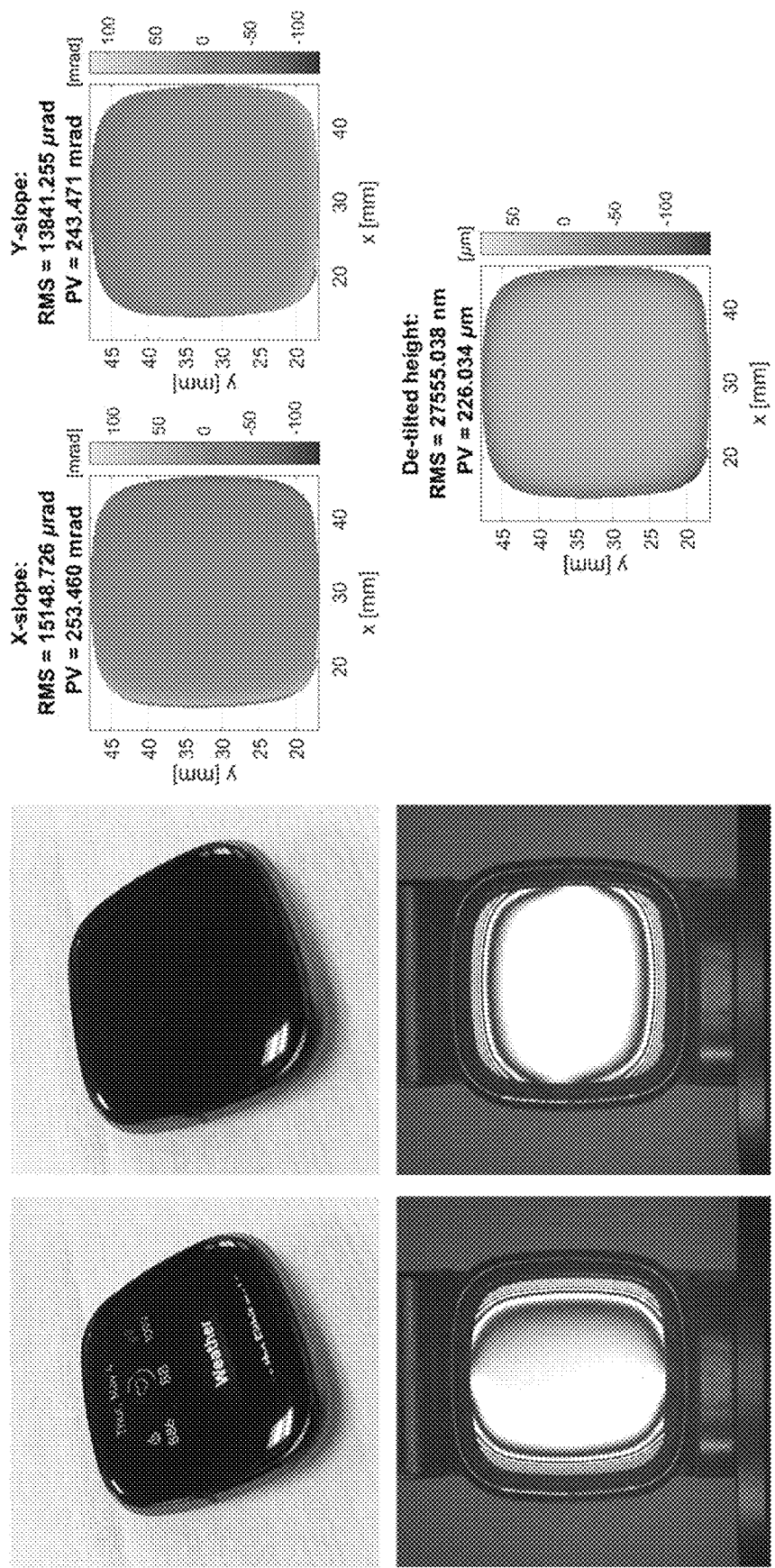
FIG. 12 depicts example results of CPMD analysis, surface slope calculations for the x slope (left), y slope (right), and a typical height map reconstruction for a test sample that is a smart watch with curved screen according to various embodiments of the present disclosure.
Figure 13:
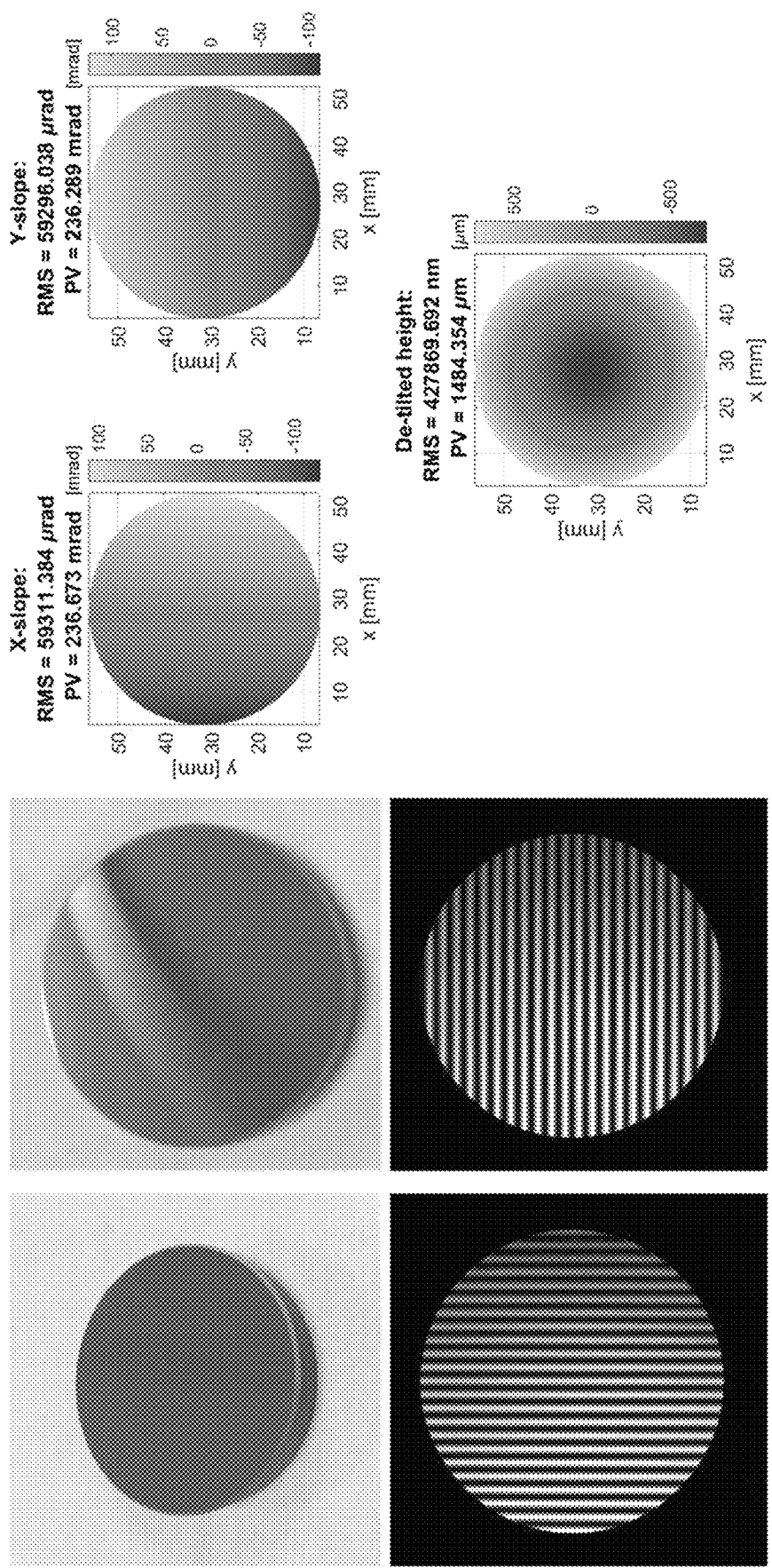
FIG. 13 depicts example results of CPMD analysis, surface slope calculations for the x slope (left), y slope (right), and a typical height map reconstruction for a test sample that is a 2-inch diameter concave mirror with radius of curvature about 200 mm according to various embodiments of the present disclosure.

Once the slopes $(s_x, s_y)$ are calculated with their location (x,y), as shown in FIG. 10, one can get the height map z by integrating the x-slope and y-slope maps. It can be completed by using either zonal or modal approaches.

$$z = intg(x, y, s_x, s_y)$$

An important feature of this invention is that all the input variables $(x,y,s_x,s_y)$ for the integration function $intg(x,y,s_x,s_y)$ are independent from the distance between the CPMD system 100 and the specimen under test, e.g., test optic 123.

Further analysis can be carried out to evaluate other properties from the surface data, such as calculating the radius of curvatures, the curl vectors existing in slope residuals, windowed filtering operation, Legendre (or Zernike) polynomial decomposition for aberration analysis, etc. All these evaluations can be handled to further understand the metrology instrument and the measurement in particular applications.

To accurately measure the shape of the specimen or test optic 123, the CPMD system 100 can be aligned and calibrated. The alignment and calibration can include several sub-system alignments and calibrations, e.g., the calibration of the camera 103 with telecentric lens 106, the alignment and calibration of the collimation optical system 116 for the conversion between the camera ray displacement on screen 113 to the local slope on the test optic 123.

The camera calibration gives the measurement lateral locations (x,y), which are the intersections between the camera rays and the surface of the specimen or test optic 123. Owing to the use of telecentric lens 106, the measurement lateral location (x,y) is independent from the axial depth location z. The camera calibration with a telecentric lens 106 model is used, instead of using the common pinhole camera model. In addition, the lens distortion can be considered to correct the measurement lateral locations (x,y) due to the distortion of the telecentric lens 106.

The alignment and calibration for the collimation optical system 116 provides the relationship between the surface slope and the position displacement of a camera ray on the screen 113. It allows direct calculation from the absolute fringe phase $(\phi_x,\phi_y)$ to the slope data $(s_x,s_y)$. The alignment of the collimation optical system 116 with the screen 113 is important to achieve the good performance of angular measurements. The compensation mechanism with a reference mirror is also a key process to improve the slope measurement accuracy for high-accuracy metrology applications.

Through these two calibration processes, one can separate the calibration for the location where the measurement happens (x,y) and the slope values $(s_x,s_y)$ from the measurement. With the proposed design, the separation of (x,y) and $(s_x,s_y)$ makes the calibration simpler than the traditional PMD system. The shape reconstruction can be easily implemented with the measured slopes and their locations.

The development of the CPMD system 100 represents an important innovation in the field of optical metrology, as it expands the measurement capabilities of the traditional PMD technique and makes it a more useful and versatile tool for optical metrology.

By enabling the measurement of low-frequency surface shape components and relaxing the axial depth tolerance of the sample positioning, the CPMD technique provides a more flexible and accurate way of measuring optical surfaces. This makes it more suitable for a wider range of applications and allows for more efficient and effective production of optical components and systems.

Furthermore, by providing a more accurate and flexible measurement of optical surfaces, the CPMD system 100 has the potential to improve the quality and performance of optical components and systems, and to drive innovation and advancement in the field of optical metrology. Overall, the development of the CPMD system 100 is a significant step forward in the PMD technique. It is expected to have a major impact on the production and use of optical components and systems in the future.

Any logic, algorithm or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same network environment 100.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and Therefore, the following is claimed:

1. A system for phase measuring deflectometry having a collimated phase measuring deflectometer, comprising:
   a screen which emits a structured light pattern from a first side;
   a collimation optical system comprising a Fourier lens, the collimation optical system disposed adjacent to the first side of the screen such that the structured light pattern emitted from the screen passes through the collimation optical system from a first side to a second side;
   a beam splitter disposed adjacent to the second side of the collimation optical system opposite the screen such that the structured light pattern passing through the collimation optical system is redirected by the beam splitter to illuminate a surface of a specimen under test at a distance from the collimated phase measuring deflectometer; and
   a camera having a telecentric lens and being disposed beyond the beam splitter opposite the specimen under test such that a deflected pattern produced by illuminating the surface of the specimen under test is captured by the camera, the deflection pattern insensitive to the distance from the collimated phase measuring deflectometer to the surface of the specimen under test.

2. The system of claim 1, wherein the telecentric lens has an on-axis optical geometry.

3. The system of claim 1, wherein the screen is disposed at a focal plane of the collimation optical system.

4. The system of claim 1, wherein the specimen under test is a test optic.

5. The system of claim 1, further comprising:
   at least one computing device, comprising a processor and a memory; and
   machine-readable instructions stored in the memory that, when executed, cause the at least one computing device to at least:
      acquire an image using the camera, the image comprising a plurality of pixels representing a fringe pattern of light reflected from the surface of the specimen under test.

6. The system of claim 5, wherein the machine-readable instructions, when executed, further cause the at least one computing device to at least:
   conduct temporal phase unwrapping for each pixel of the plurality of pixels to identify an absolute fringe phase value for each pixel;
   calculate a surface slope for each pixel based at least in part on the absolute fringe phase value and a focal length of the collimation optical system; and
   generate a height map of the surface of the specimen under test based at least in part on the surface slope and a location of each pixel.

7. The system of claim 6, wherein the height map is generated by integrating the surface slope and the location of each pixel.

8. The system of claim 6, wherein the temporal phase unwrapping comprises multi-frequency, multi-wavelength, or number-theoretical temporal phase unwrapping.

9. A method, comprising:
   housing a screen, a collimation optical system, a beam splitter and a camera in a collimated phase measuring deflectometer,
   emitting, by the screen, light in a structured light pattern to illuminate a specimen under test;
   collimating, by the collimation optical system comprising a Fourier lens, the light emitted by the screen;
   reflecting, by the beam splitter, at least a portion of the light collimated by the collimation optical system thereby illuminating a surface of the specimen under test with the structured light pattern, the surface of the specimen under test located at a distance from the collimated phase measuring deflectometer; and
   acquiring, by a camera, an image of a deflected pattern produced by illuminating the surface of the specimen under test with the structured light pattern, the deflection pattern insensitive to the distance from the collimated phase measuring deflectometer to the surface of the specimen under test.

10. The method of claim 9, further comprising:
    determining, by at least one computing device connected to the collimated phase measuring deflectometer, a wrapped phase value for each pixel of a plurality of pixels of the image;
    determining, by the at least one computing device, an absolute fringe phase value for each pixel of the plurality of pixels based at least in part on the wrapped phase value; and
    calculating, by the at least one computing device, a surface slope for each pixel based at least in part on the absolute fringe phase value and a focal length of the collimation optical system.

11. The method of claim 10, wherein determining the wrapped phase value for each pixel further comprises performing, by the at least one computing device, phase shifting for the plurality of pixels to obtain a wrapped phase value for each of the plurality of pixels in the image.

12. The method of claim 10, wherein determining the absolute fringe phase value for each pixel further comprises conducting, by the at least one computing device, temporal phase unwrapping for each pixel of the plurality of pixels in the image to obtain the absolute fringe phase value for each pixel.

13. The method of claim 12, wherein the temporal phase unwrapping comprises multi-frequency, multi-wavelength, or number-theoretical temporal phase unwrapping.

14. The method of claim 10, further comprising:
    calculating, by the at least one computing device, a surface slope for each pixel based at least in part on the absolute fringe phase value and a focal length of the collimation optical system; and
    generating, by the at least one computing device, a height map of the surface of the specimen under test based at least in part on the surface slope and a location of each pixel.

15. The method of claim 14, further comprising generating the height map by integrating the surface slope and the location of each pixel.

16. A system having a collimated phase measuring deflectometer, comprising:
    a camera having a telecentric lens;
    a beam splitter disposed in a line of view of the camera and angled such that light transmitted through the beam splitter is directed toward the telecentric lens;
    a specimen under test disposed opposite the beam splitter from the camera and aligned with the beam splitter such that light reflected from a surface of the specimen under test is directed through the beam splitter toward the telecentric lens;

a collimation optics system comprising a Fourier lens, the collimation optics system disposed adjacent to the beam splitter such that collimated light from the collimation optics system is reflected by the beam splitter to the surface of the specimen under test; and a screen disposed at a focal plane of the collimation optics system, the screen configured to emit a structured light pattern toward the collimation optics system thereby illuminating the surface of the specimen under test with the structured light pattern, the illumination producing a deflected pattern directed through the beam splitter toward the telecentric lens that is insensitive to a distance between the collimated phase measuring deflectometer and the surface of the specimen under test.

17. The system of claim 16, wherein the telecentric lens has an on-axis optical geometry.

18. The system of claim 16, wherein the specimen under test is a test optic.

19. The system of claim 16, further comprising:

at least one computing device connected to the collimated phase measuring deflectometer, comprising a processor and a memory; and machine-readable instructions stored in the memory that, when executed, cause the at least one computing device to at least:

acquire an image using the camera, the image comprising a plurality of pixels representing a fringe pattern of light reflected from the surface of the specimen under test.

20. The system of claim 19, wherein the machine-readable instructions, when executed, further cause the at least one computing device to at least:

conduct temporal phase unwrapping for each pixel of the plurality of pixels to identify an absolute fringe phase value for each pixel;

calculate a surface slope for each pixel based at least in part on the absolute fringe phase value and a focal length of the collimation optical system; and generate a height map of the surface of the specimen under test based at least in part on the surface slope and a location of each pixel.

* * * * *